(12) United States Patent
Baek

(10) Patent No.: US 12,097,854 B2
(45) Date of Patent: Sep. 24, 2024

(54) VEHICLE AND METHOD OF CONTROLLING THE SAME

(71) Applicant: HL KLEMOVE CORP., Incheon (KR)

(72) Inventor: Hyunwoo Baek, Seongnam-si (KR)

(73) Assignee: HL KLEMOVE CORP., Incheon (KR)

( * ) Notice: Subject to any disclaimer, the term of this patent is extended or adjusted under 35 U.S.C. 154(b) by 647 days.

(21) Appl. No.: 17/197,173

(22) Filed: Mar. 10, 2021

(65) Prior Publication Data

US 2021/0284153 A1  Sep. 16, 2021

(30) Foreign Application Priority Data

Mar. 11, 2020 (KR) ........................ 10-2020-0030100

(51) Int. Cl.
*B60W 30/16* (2020.01)
*B60W 30/18* (2012.01)
*B60W 40/105* (2012.01)

(52) U.S. Cl.
CPC ...... *B60W 30/16* (2013.01); *B60W 30/18163* (2013.01); *B60W 40/105* (2013.01); *B60W 2420/403* (2013.01); *B60W 2420/408* (2024.01); *B60W 2554/4042* (2020.02); *B60W 2554/4043* (2020.02); *B60W 2554/802* (2020.02)

(58) Field of Classification Search
CPC ........... B60W 30/16; B60W 30/18163; B60W 40/105; B60W 2420/42; B60W 2420/52; B60W 2554/4042; B60W 2554/4043; B60W 2554/802; B60W 2754/30; B60W 2554/80; B60W 2554/801; B60W 30/095; B60W 50/14; B60W 40/02; B60W 60/001; B60W 2520/10; B60W 2420/403; B60W 2420/408; B60Y 2400/303; G05D 1/00; G08G 1/00; G01C 21/00
See application file for complete search history.

(56) References Cited

U.S. PATENT DOCUMENTS

| | | | | |
|---|---|---|---|---|
| 9,002,614 | B2 * | 4/2015 | Tominaga | B60W 50/0097 701/96 |
| 9,595,191 | B1 * | 3/2017 | Surpi | G08G 1/0112 |
| 10,882,523 | B2 * | 1/2021 | Knitt | B60W 50/085 |
| 10,885,790 | B2 * | 1/2021 | Kim | B60W 30/08 |
| 11,151,880 | B1 * | 10/2021 | Shou | G08G 1/0141 |
| 11,794,781 | B2 * | 10/2023 | Choi | B60W 60/0016 |

(Continued)

FOREIGN PATENT DOCUMENTS

| KR | 10-1570703 B1 | 11/2015 |
|---|---|---|
| KR | 10-2019-0105026 A | 9/2019 |

*Primary Examiner* — Angelina M Shudy
(74) *Attorney, Agent, or Firm* — Hauptman Ham, LLP

(57) ABSTRACT

Provided is a apparatus for assisting driving of a host vehicle, the apparatus comprising: at least one sensor of an image sensor or a radar sensor mounted to the host vehicle and having a field of view outside of the host vehicle; and a controller communicatively connected to the at least one sensor, wherein the controller is configured to: identify at least one surrounding vehicle around the host vehicle based on processing an output of the at least one sensor, calculate a target inter-vehicle distance based on the own vehicle speed and a driver set distance received from a driver, and vary the calculated target inter-vehicle distance based on driving information of the at least one surrounding vehicle.

10 Claims, 13 Drawing Sheets

(56) References Cited

U.S. PATENT DOCUMENTS

| | | | |
|---|---|---|---|
| 11,904,889 B1* | 2/2024 | Lumb | B60W 60/001 |
| 2003/0045991 A1* | 3/2003 | Isogai | B60K 31/18 |
| | | | 180/170 |
| 2010/0023296 A1* | 1/2010 | Huang | B60W 40/09 |
| | | | 702/141 |
| 2010/0209881 A1* | 8/2010 | Lin | G09B 19/167 |
| | | | 434/66 |
| 2013/0085976 A1* | 4/2013 | Bone | B60W 30/18163 |
| | | | 706/46 |
| 2013/0226433 A1* | 8/2013 | Tominaga | B60W 50/0097 |
| | | | 701/96 |
| 2014/0236449 A1* | 8/2014 | Horn | B60W 30/16 |
| | | | 701/96 |
| 2015/0142292 A1* | 5/2015 | Kastner | B60W 40/04 |
| | | | 701/96 |
| 2015/0321699 A1* | 11/2015 | Rebhan | B60W 30/18163 |
| | | | 701/23 |
| 2015/0353087 A1* | 12/2015 | Niino | B60W 30/16 |
| | | | 701/96 |
| 2016/0304092 A1* | 10/2016 | Rebhan | B60W 30/16 |
| 2016/0325743 A1* | 11/2016 | Schmüdderich | B60W 30/14 |
| 2016/0339914 A1* | 11/2016 | Habu | B60W 30/165 |
| 2018/0001894 A1* | 1/2018 | Masui | B60W 10/06 |
| 2018/0061253 A1* | 3/2018 | Hyun | G08G 1/0175 |
| 2018/0089911 A1* | 3/2018 | Rath | G06Q 50/30 |
| 2018/0253975 A1* | 9/2018 | Mizutani | B60W 30/18163 |
| 2018/0359619 A1* | 12/2018 | Ma | H04W 4/44 |
| 2019/0095809 A1* | 3/2019 | Hyun | G08G 1/167 |
| 2019/0143968 A1* | 5/2019 | Song | G08G 1/166 |
| | | | 701/301 |
| 2019/0143983 A1* | 5/2019 | Hashimoto | G05D 1/0088 |
| | | | 701/23 |
| 2019/0180626 A1* | 6/2019 | Kim | G08G 1/167 |
| 2019/0217861 A1* | 7/2019 | Kurahashi | B60W 30/165 |
| 2019/0263401 A1* | 8/2019 | Yoo | G08G 1/167 |
| 2019/0266421 A1* | 8/2019 | Kim | H04N 7/188 |
| 2019/0329762 A1* | 10/2019 | Kwon | B60W 30/0956 |
| 2020/0001867 A1* | 1/2020 | Mizutani | B60W 30/0956 |
| 2020/0001871 A1* | 1/2020 | Wang | B60W 30/162 |
| 2020/0010088 A1* | 1/2020 | Kokaki | B60W 30/188 |
| 2020/0055495 A1* | 2/2020 | Takaki | B60T 8/17 |
| 2020/0189592 A1* | 6/2020 | Jang | B60W 30/18 |
| 2020/0238982 A1* | 7/2020 | Kang | B60W 10/184 |
| 2020/0301428 A1* | 9/2020 | Tosaki | B60W 50/14 |
| 2020/0361471 A1* | 11/2020 | Choi | G05D 1/0223 |
| 2021/0001848 A1* | 1/2021 | Oh | B60W 30/095 |
| 2021/0009127 A1* | 1/2021 | Horiba | B60W 50/0097 |
| 2021/0031767 A1* | 2/2021 | Kim | G08G 1/22 |
| 2021/0107482 A1* | 4/2021 | Uematsu | G08G 1/16 |
| 2021/0192955 A1* | 6/2021 | Kang | B60W 50/14 |
| 2021/0237779 A1* | 8/2021 | Das | G08G 1/167 |
| 2021/0284153 A1* | 9/2021 | Baek | B60W 30/16 |
| 2021/0300306 A1* | 9/2021 | Costin | B60T 8/171 |
| 2021/0383693 A1* | 12/2021 | Park | G08G 1/0965 |
| 2021/0387621 A1* | 12/2021 | Takano | B60W 30/165 |
| 2022/0001859 A1* | 1/2022 | Park | B60W 30/0956 |
| 2022/0135044 A1* | 5/2022 | Jang | B60W 50/0098 |
| | | | 701/41 |
| 2022/0219692 A1* | 7/2022 | Taniguchi | B60W 50/082 |
| 2022/0234583 A1* | 7/2022 | Kang | G06V 20/58 |
| 2022/0348203 A1* | 11/2022 | Sun | B60W 30/16 |
| 2022/0348227 A1* | 11/2022 | Foster | G06V 20/588 |
| 2022/0402491 A1* | 12/2022 | Jaekel | B60W 30/16 |
| 2023/0021000 A1* | 1/2023 | Okonogi | B60W 30/16 |
| 2023/0021802 A1* | 1/2023 | Kim | H04L 12/12 |
| 2023/0073860 A1* | 3/2023 | Baek | B60W 30/18163 |
| 2023/0112878 A1* | 4/2023 | Hiramatsu | B60W 40/04 |
| | | | 382/104 |
| 2023/0114781 A1* | 4/2023 | Hiramatsu | B60W 40/04 |
| | | | 701/26 |
| 2023/0143814 A1* | 5/2023 | Krampell | B60W 50/14 |
| | | | 701/23 |
| 2023/0150539 A1* | 5/2023 | Oh | B60W 50/0098 |
| | | | 701/26 |
| 2023/0154333 A1* | 5/2023 | Morimoto | G08G 1/167 |
| | | | 701/119 |
| 2023/0219565 A1* | 7/2023 | An | B60W 40/12 |
| | | | 701/301 |
| 2023/0256968 A1* | 8/2023 | Baek | B60W 30/16 |
| | | | 701/96 |
| 2023/0322218 A1* | 10/2023 | Meriçli | B60W 30/143 |
| | | | 701/96 |

* cited by examiner

[FIG.1]
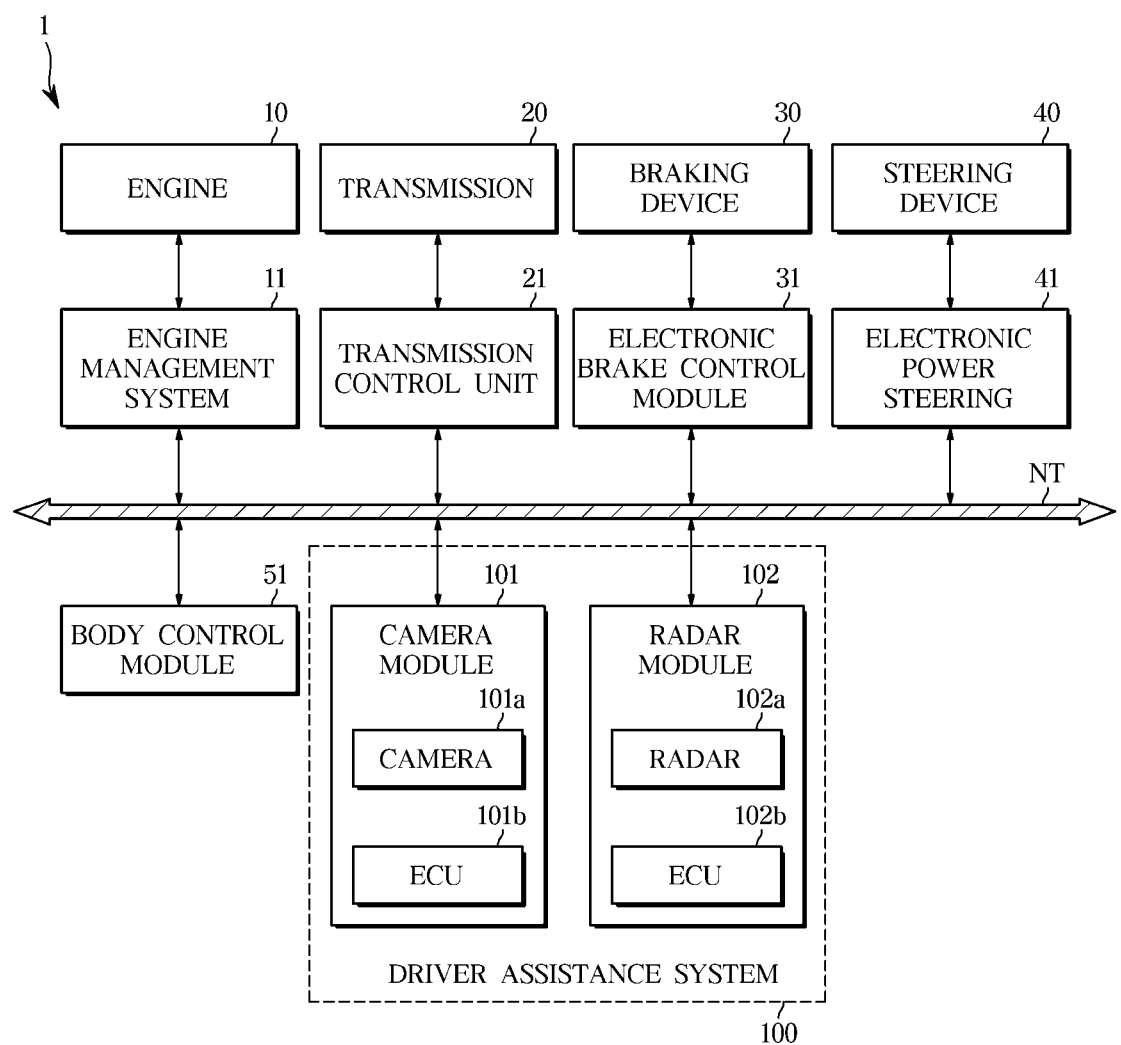

[FIG. 2]
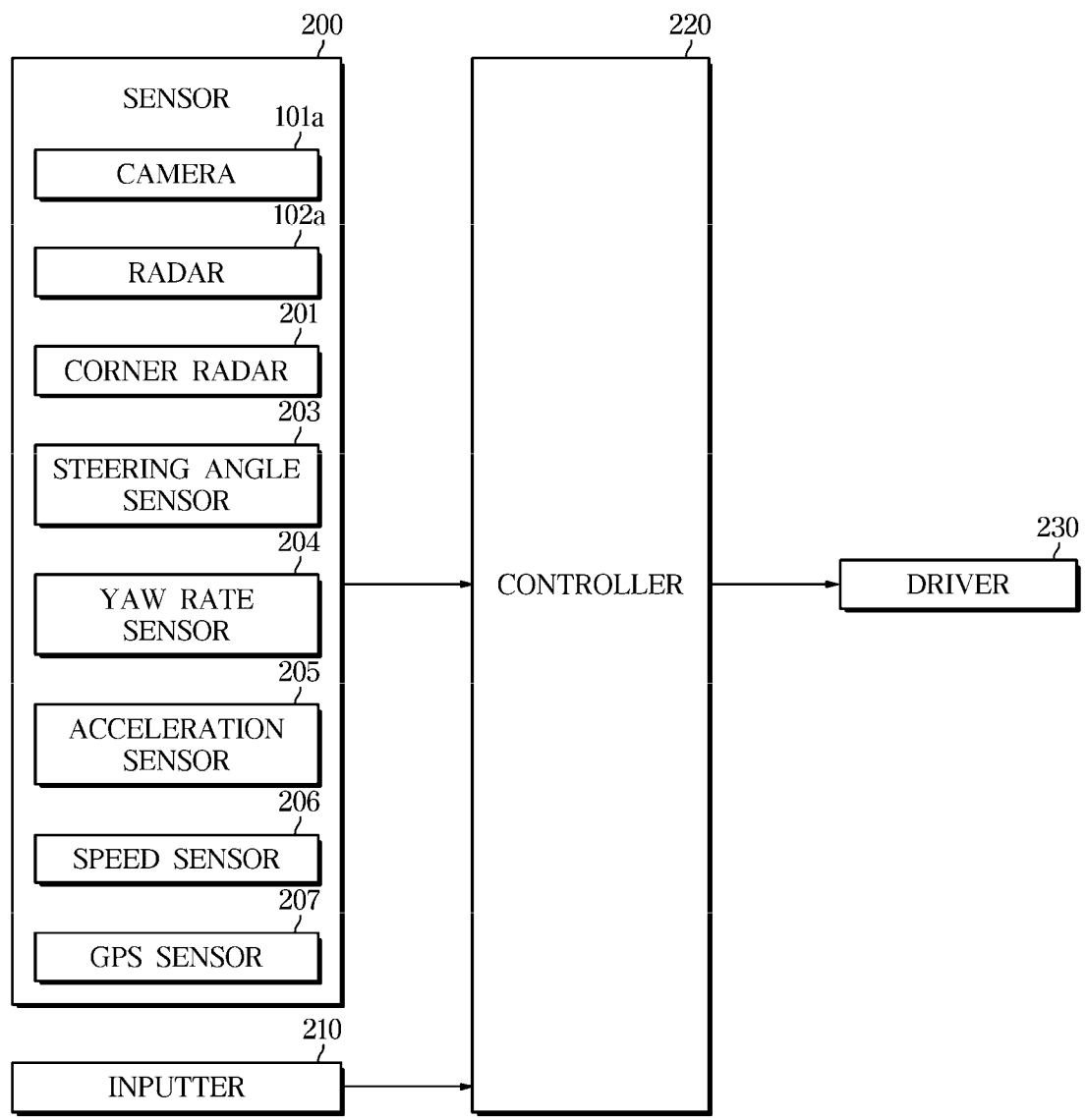

[FIG. 3]
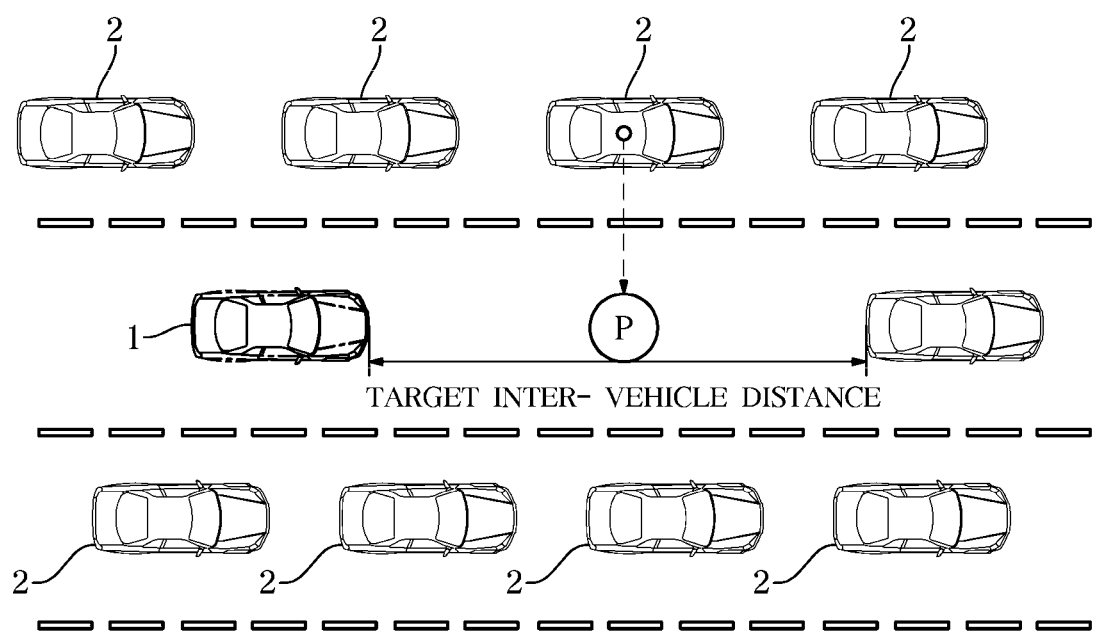

[FIG. 4]
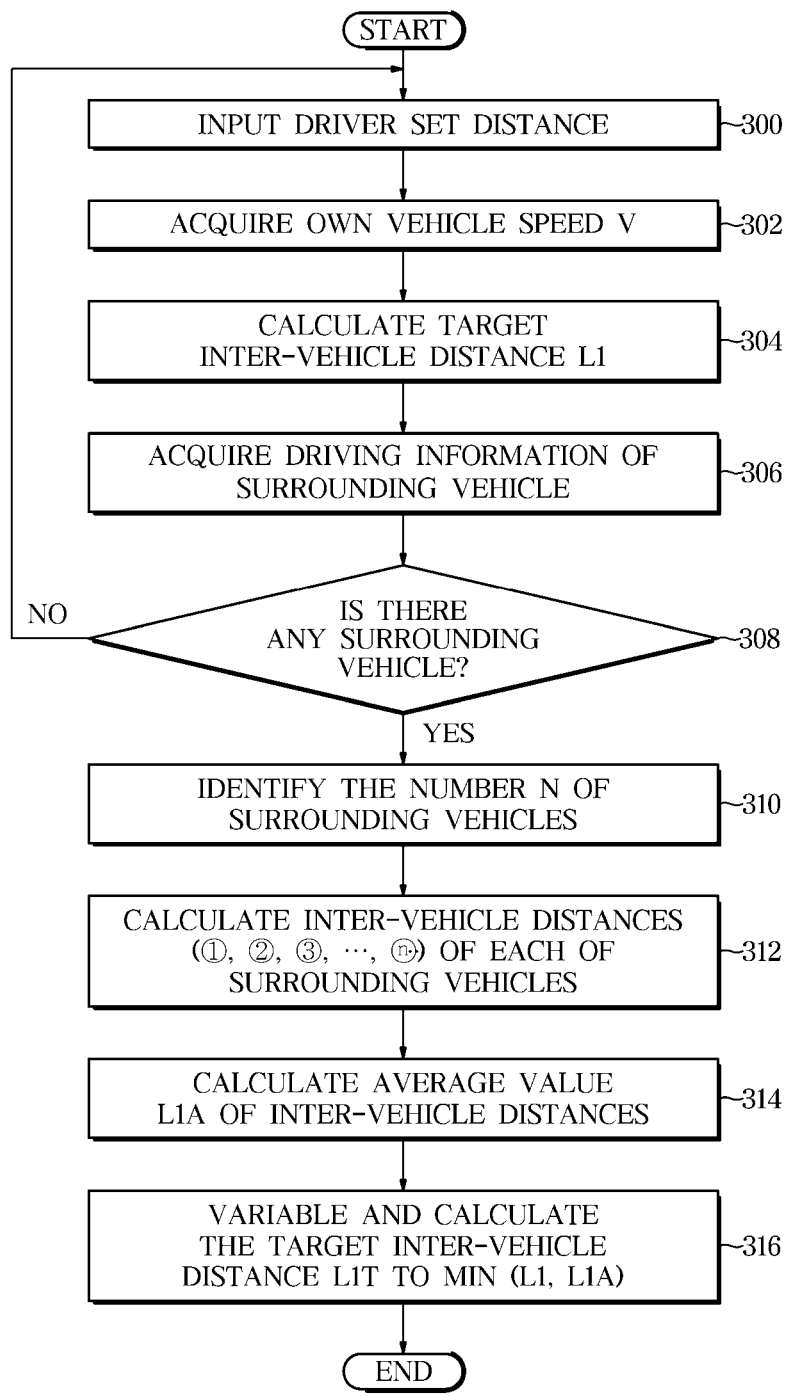

[FIG. 5]
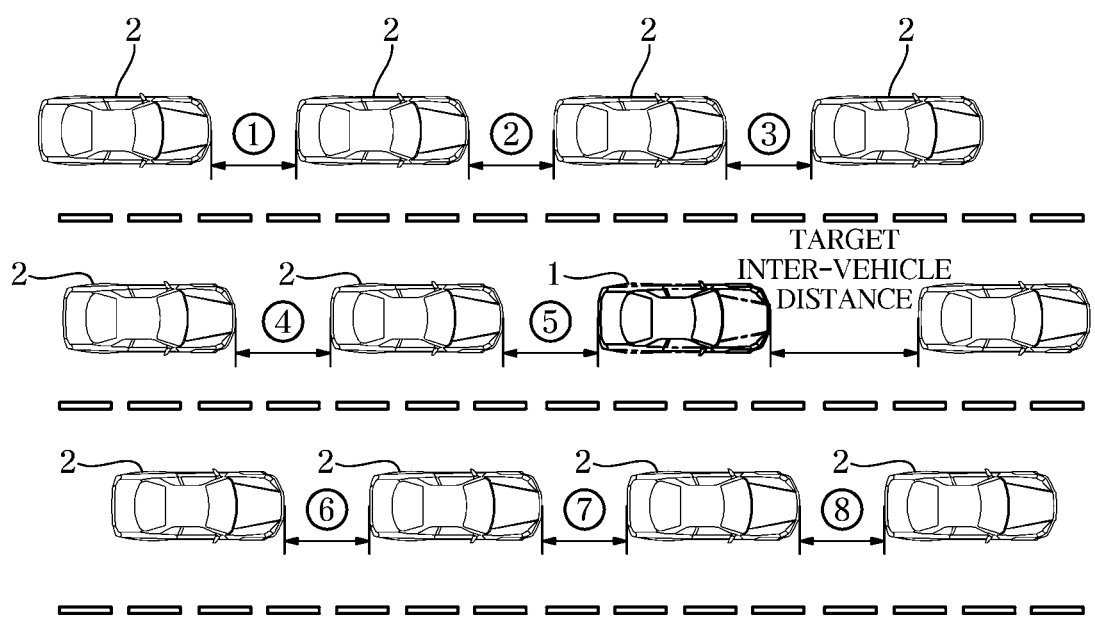

[FIG. 6]
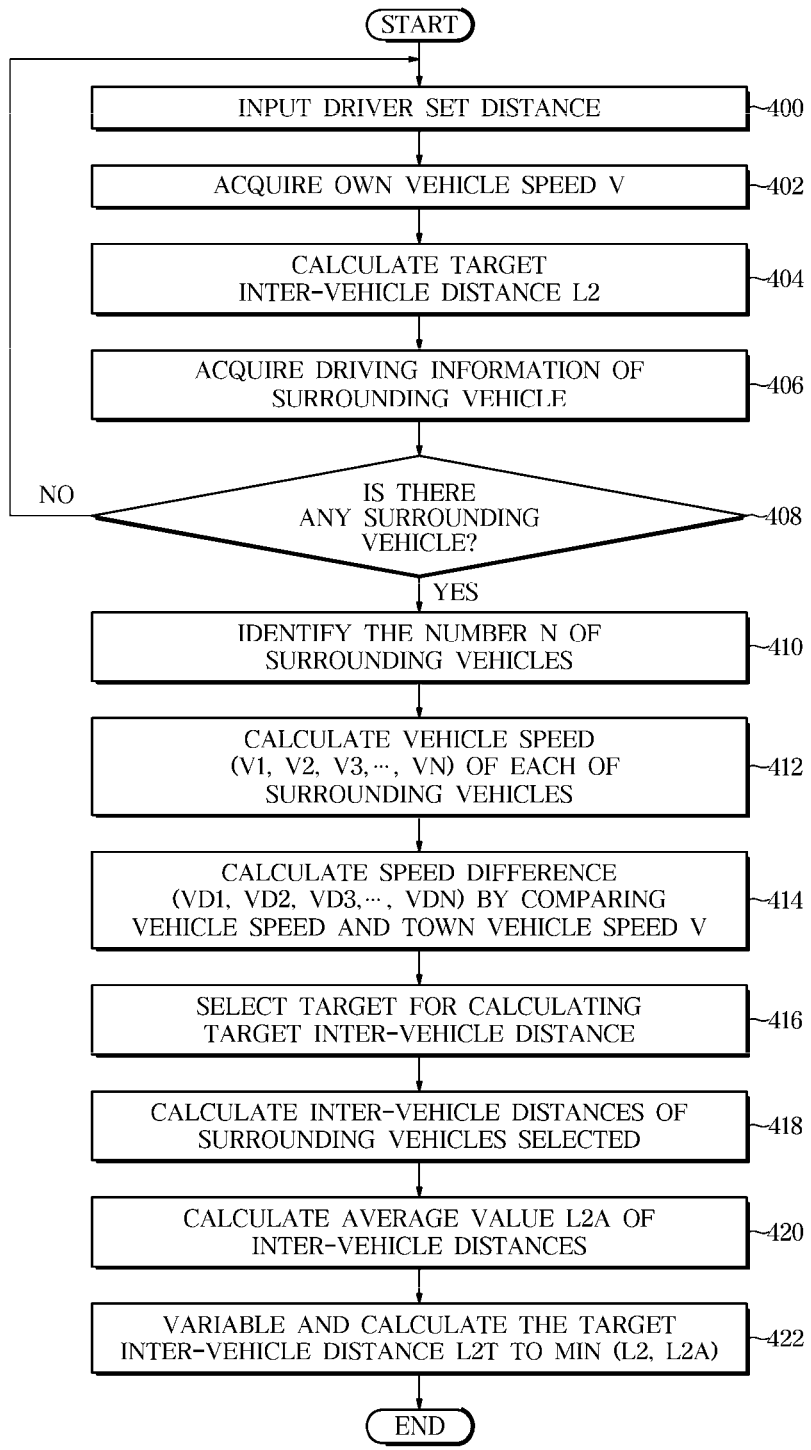

[FIG. 7]
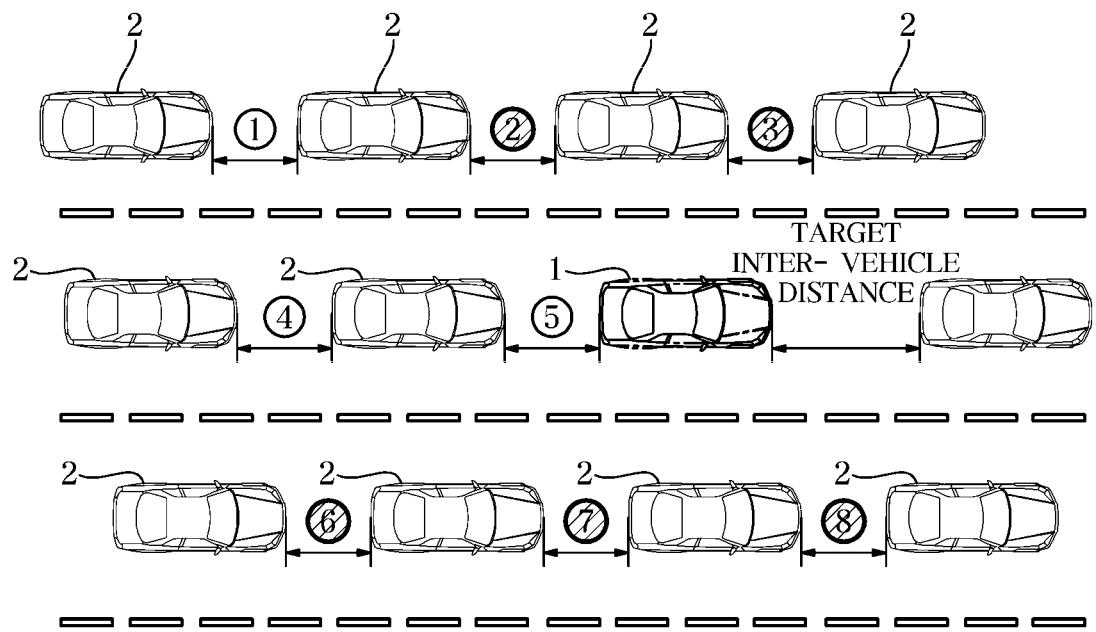

[FIG. 8]
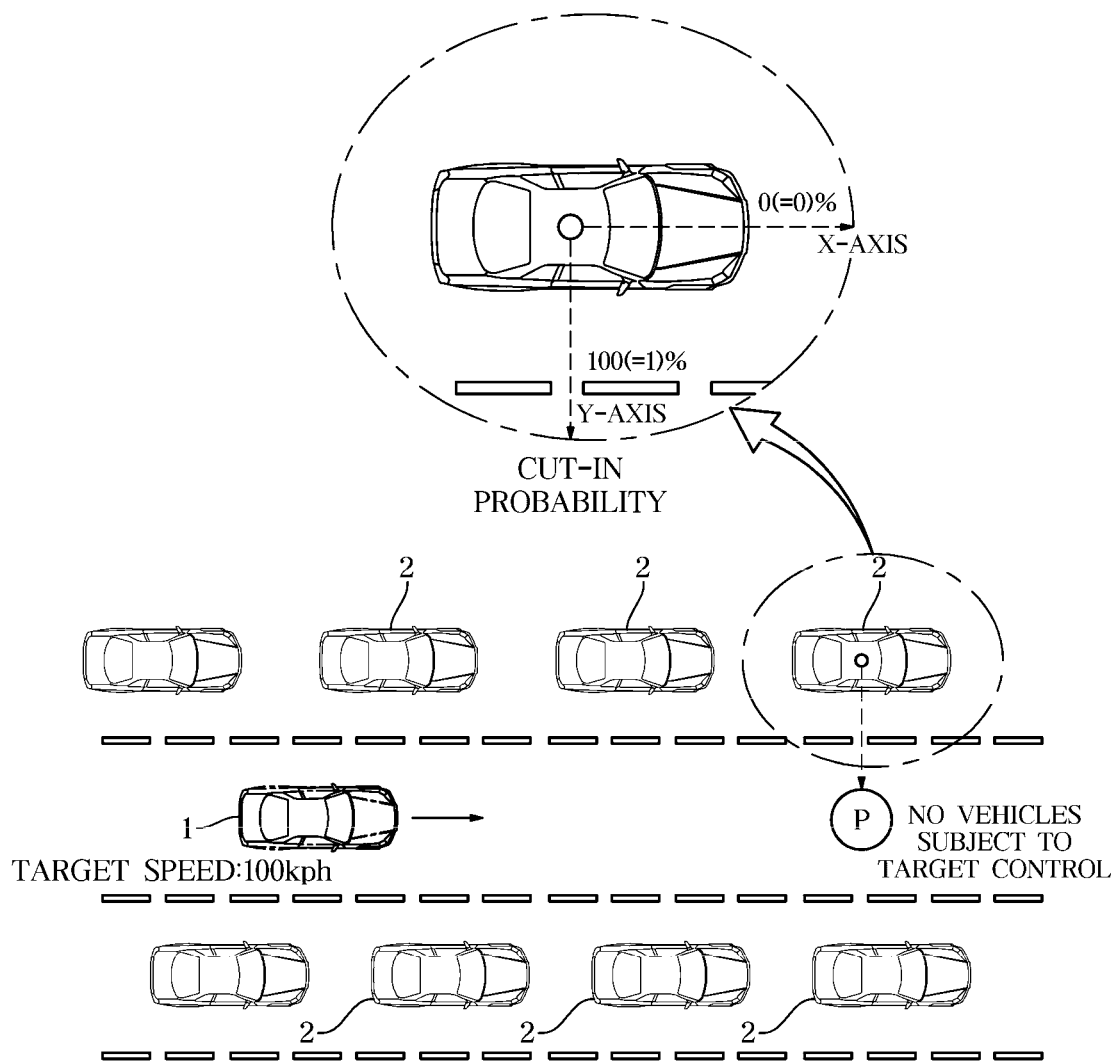

[FIG. 9]
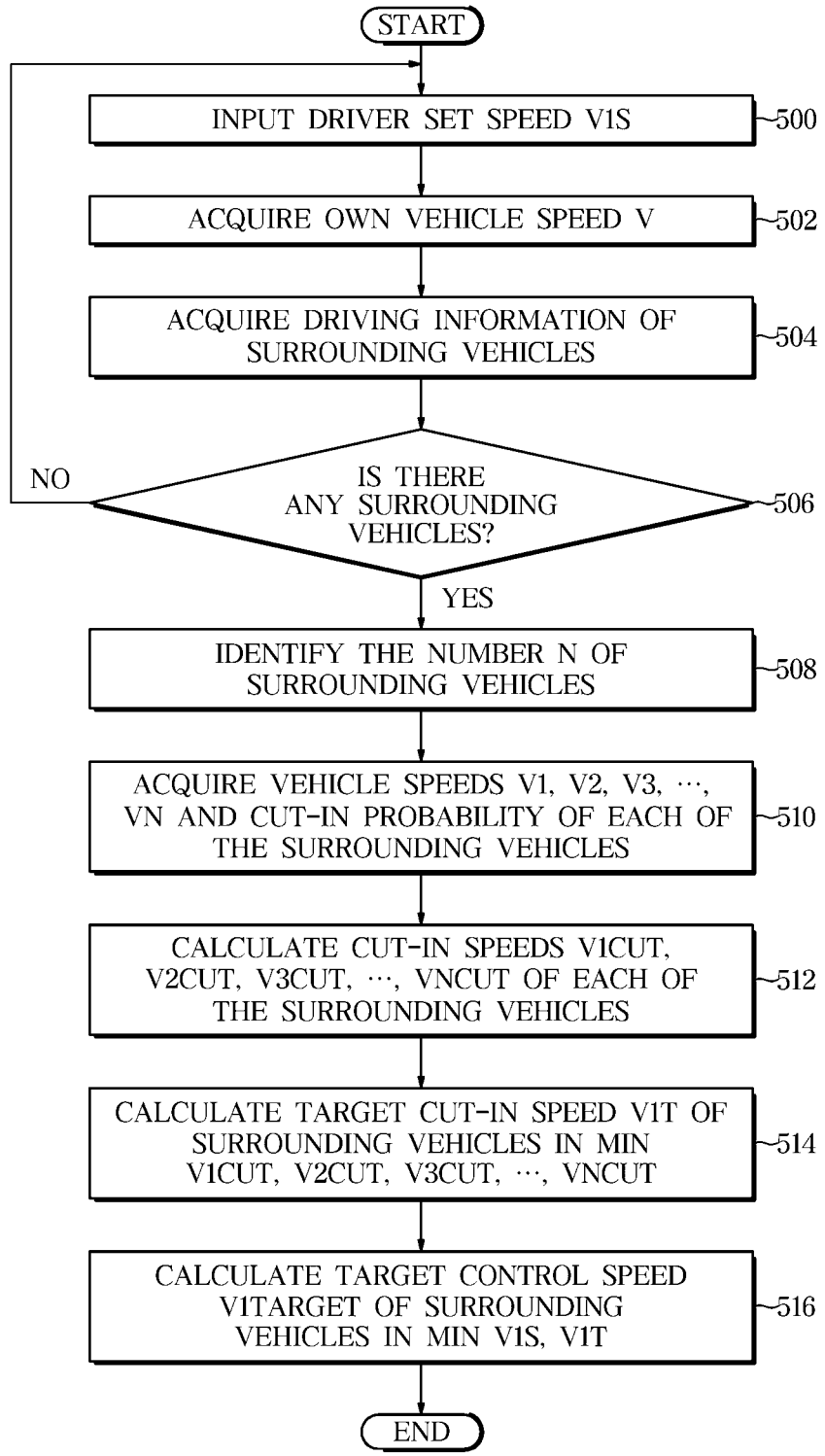

[FIG. 10]
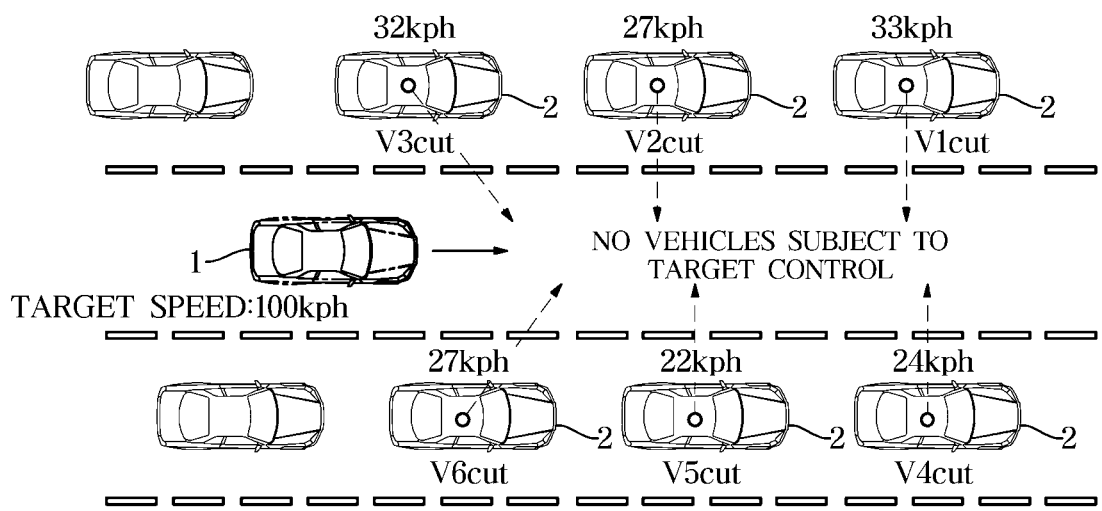

[FIG. 11A]
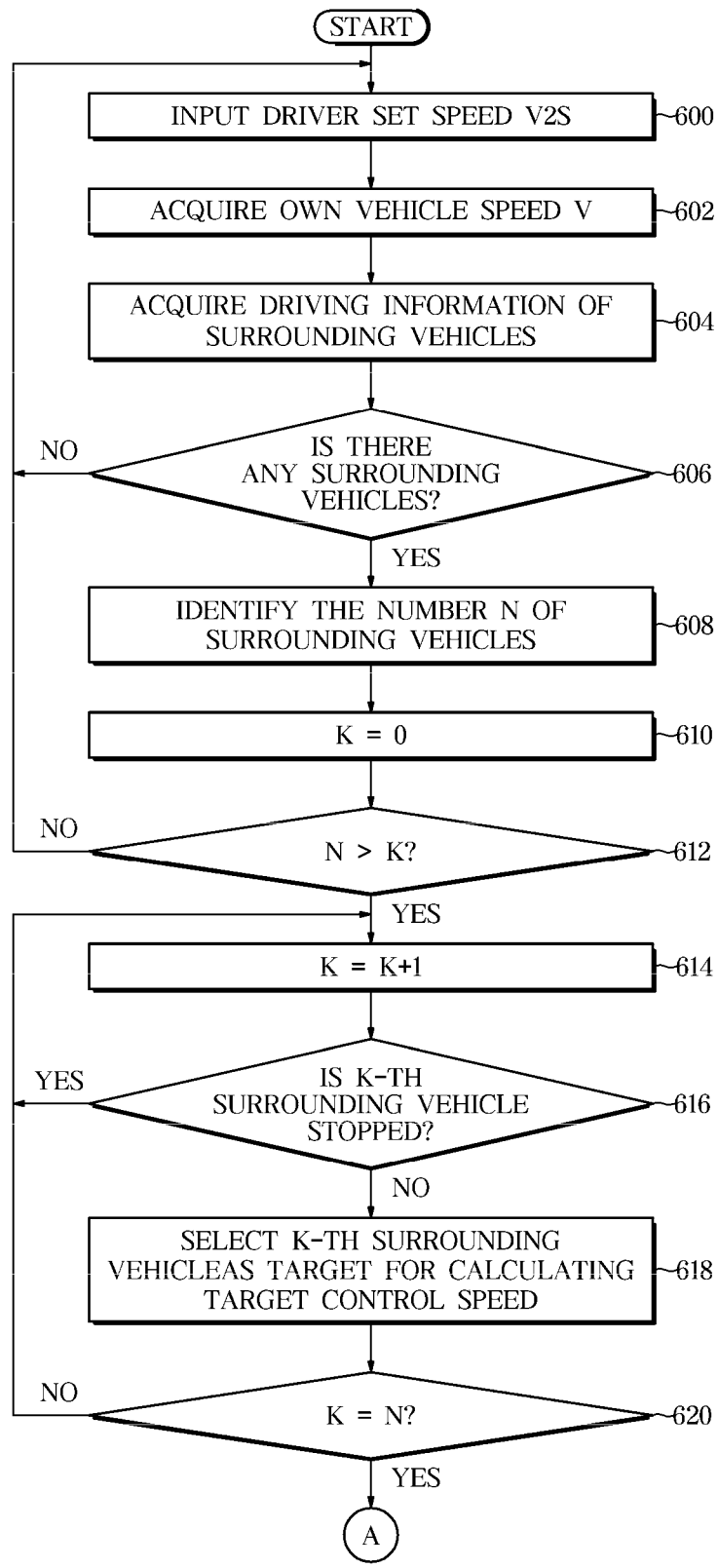

[FIG. 11B]
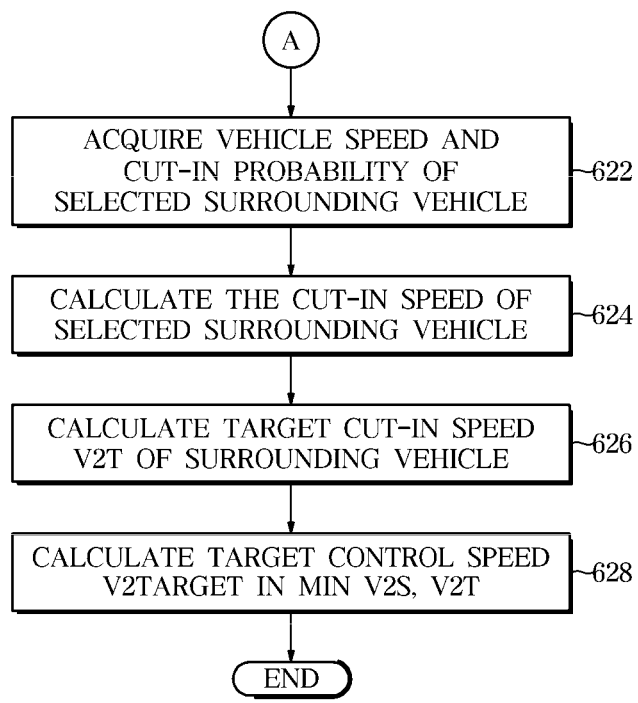

[FIG. 12]
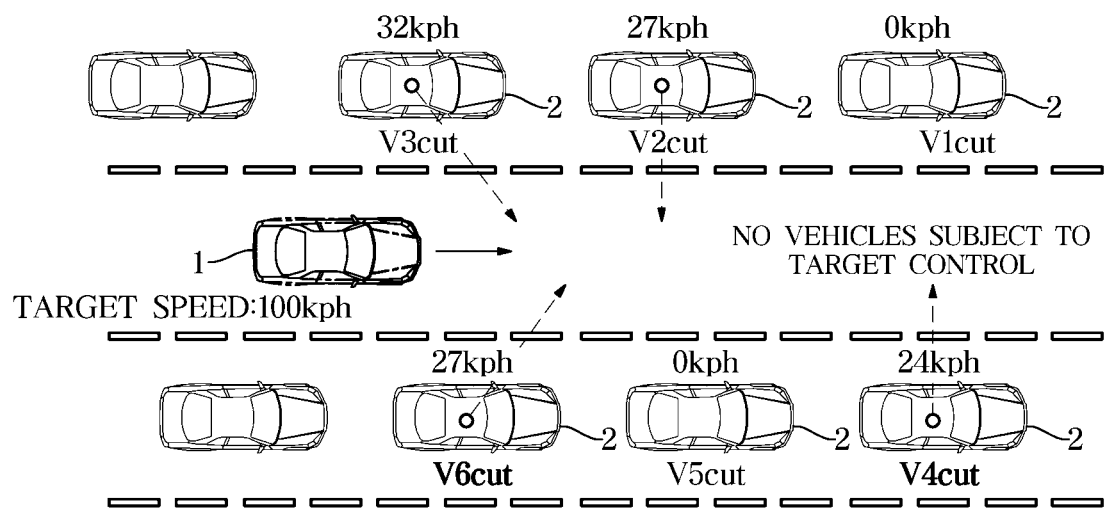

VEHICLE AND METHOD OF CONTROLLING THE SAME

CROSS-REFERENCE TO RELATED APPLICATION

This application is based on and claims priority under 35 U.S.C. § 119 to Korean Patent Application No. 10-2020-0030100, filed on Mar. 11, 2020 in the Korean Intellectual Property Office, the disclosure of which is incorporated herein by reference.

BACKGROUND

1. Field

The present invention relates to a vehicle for performing autonomous driving and a method of controlling the same.

2. Description of the Related Art

Recently, various advanced driver assistance systems (ADAS) are being developed for autonomous driving for the driver's convenience and conveying driving information of the vehicle to the driver in order to prevent accidents caused by negligence of the driver.

Adaptive cruise control (ACC), which is one of these driver assistance systems, is a system that allows the vehicle to drive while maintaining the speed without the driver's manipulation if the driver sets the desired speed.

Such an adaptive cruise control (ACC) performs speed control to drive at a speed set by a driver when there is no target control vehicle ahead, and performs distance control to maintain the target vehicle distance through a distance measurement sensor (for example, a camera, a radar, a lidar, etc.) when there is target control vehicle.

On expressways or automobile-only roads to which the ACC is applied, there is a branch that merges (join point) or diverges (branch point) with other roads such as intervary (IC) or junction (JC). In addition, there is a point where the road ends (end point), and there are bottlenecks where lanes are reduced when there is road construction. Lane varies of vehicles are very frequent in such a congested section. That is, when viewed based on the vehicle itself (own vehicle), a cut-in situation often occurs in which surrounding vehicles in the next lane are interrupted.

Accordingly, in a congested section where a cut-in situation frequently occurs, traffic flow may be disturbed due to an excessive target distance.

SUMMARY

Therefore, it is an object of the disclosure to provide a vehicle capable of varying a target inter-vehicle distance and a target control speed in consideration of a driving situation of surrounding vehicles in a congestion section where a cut-in situation frequently occurs, and a method of controlling thereof.

It is an aspect of the disclosure to provide an apparatus for assisting driving of a host vehicle, comprising: at least one sensor of an image sensor or a radar sensor mounted to the host vehicle and having a field of view outside of the host vehicle; and a controller communicatively connected to the at least one sensor, wherein the controller is configured to: identify at least one surrounding vehicle around the host vehicle based on processing an output of the at least one sensor, calculate a target inter-vehicle distance based on the own vehicle speed and a driver set distance received from a driver, and vary the calculated target inter-vehicle distance based on driving information of the at least one surrounding vehicle.

The controller may determine whether the at least one surrounding vehicle exists using driving information of the at least one surrounding vehicle, and identify the number of the surrounding vehicles.

The controller may calculate an average inter-vehicle distance by using the number of the surrounding vehicles and the inter-vehicle distances of each of the surrounding vehicles.

The controller may calculate the variable target inter-vehicle distance as a minimum value among the calculated target inter-vehicle distance and the calculated average value of the inter-vehicle distance.

The controller may calculate a vehicle speed of each of the surrounding vehicles, calculate a speed difference of each of the surrounding vehicles by comparing the calculated vehicle speed with the own vehicle speed, and select corresponding surrounding vehicles as targets for calculating a target inter-vehicle distance using the calculated speed difference of each of the surrounding vehicles.

The controller may calculate an average inter-vehicle distance by using the number of corresponding surrounding vehicles selected as targets for calculating the target inter-vehicle distance and the inter-vehicle distances of each of the corresponding surrounding vehicles.

The controller may calculate the variable target inter-vehicle distance as a minimum value among the calculated target inter-vehicle distance and the calculated average value of the inter-vehicle distance.

It is another aspect of the disclosure to provide method for assisting driving of a host vehicle, the method comprising: processing an output of at least one sensor of an image sensor or a radar sensor mounted to the host vehicle and having a field of view outside of the host vehicle; identify at least one surrounding vehicle around the host vehicle based on the processing of the output of the at least one sensor;
calculating a target inter-vehicle distance based on the own vehicle speed and a driver set distance received from a driver; determining whether the at least one surrounding vehicle exists based on driving information of the at least one surrounding vehicle; confirming the number of the surrounding vehicles based on the at least one surrounding vehicle existing; calculating an average value of inter-vehicle distance based on the number of the surrounding vehicles and the inter-vehicle distance of each of the surrounding vehicles; and varying the target inter-vehicle distance to a minimum value among the calculated target inter-vehicle distance and the calculated average value of the inter-vehicle distance.

In addition, the method may further include calculating a vehicle speed of each of the surrounding vehicles; calculating a vehicle speed of each of the surrounding vehicles; calculating a speed difference of each of the surrounding vehicles by comparing the calculated vehicle speed with the own vehicle speed; and selecting corresponding surrounding vehicles as targets for calculating a target inter-vehicle distance by using the calculated speed difference of each of the surrounding vehicles.

In addition, the method may further include calculating an average value of an inter-vehicle distance using the number of corresponding surrounding vehicles selected as the target for calculating the target inter-vehicle distance and the inter-vehicle distance of each of the corresponding surrounding vehicles.

In addition, the method may further include calculating the variable target inter-vehicle distance as a minimum value among the calculated target inter-vehicle distance and the calculated average value of the inter-vehicle distance.

It is another aspect of the disclosure to provide an apparatus for assisting driving of a host vehicle, the apparatus comprising: at least one sensor of an image sensor or a radar sensor mounted to the host vehicle and having a field of view outside of the host vehicle; and a controller communicatively connected to the at least one sensor, wherein the controller is configured to: identify at least one surrounding vehicle around the host vehicle based on processing an output of the at least one sensor, calculate a target cut-in speed of the at least one surrounding vehicle based on driving information of the at least one surrounding vehicle, and vary a target control speed based on the calculated target cut-in speed and a driver set speed.

The controller may determine whether the at least one surrounding vehicle exists by using driving information of the at least one surrounding vehicle, and identify the number of the surrounding vehicles.

The controller may acquire a vehicle speed and a cut-in probability of each of the surrounding vehicles, calculate a cut-in speed of each of the surrounding vehicles using the acquired vehicle speed and cut-in probability of each of the surrounding vehicles, and calculate the target cut-in speed by using the calculated cut-in speed of each of the surrounding vehicles.

The controller may receive a signal transmitted from the sensor and detect a lateral acceleration generated when the at least one surrounding vehicle is cut in to acquire the cut-in probability.

The controller may calculate the target cut-in speed as a minimum value among the calculated cut-in speeds of each of the surrounding vehicles.

The controller may calculate the variable target control speed as a minimum value among the calculated target cut-in speed and the driver set speed.

The controller may identify a surrounding vehicle being stopped according to the vehicle speed of each of the surrounding vehicles, and select surrounding vehicles driving excluding the surrounding vehicle being stopped as targets for calculating a target control speed.

The controller may acquire a vehicle speed and a cut-in probability of each of the surrounding vehicles selected as the target vehicle for calculating the target control speed, calculate a cut-in speed of each of the surrounding vehicles using the acquired vehicle speed and cut-in probability of each of the surrounding vehicles, and calculate the target cut-in speed as a minimum value among the calculated cut-in speeds of each of the surrounding vehicles.

The controller may calculate the variable target control speed as a minimum value among the calculated target cut-in speed and the driver set speed.

According to the vehicle and the method of controlling thereof according to one aspect, It is possible to implement autonomous driving similar to a driver's driving habits without disturbing traffic flow by varying the target distance and target control speed in consideration of the driving situation of surrounding vehicles in the congestion section where cut-in situations occur frequently.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 is a block diagram of a vehicle according to an exemplary embodiment.

FIG. 2 is a control block diagram of a vehicle according to an exemplary embodiment.

FIG. 3 is a diagram illustrating a cut-in situation of a surrounding vehicle while driving in a congestion section according to an exemplary embodiment.

FIG. 4 is an operation flowchart illustrating a method of controlling a vehicle for calculating by varying a target inter-vehicle distance according to an exemplary embodiment.

FIG. 5 is a diagram illustrating a congestion section for calculating a target inter-vehicle distance in the controlling method of FIG. 4.

FIG. 6 is an operation flowchart illustrating a method of controlling a vehicle for calculating by varying a target inter-vehicle distance according to another exemplary embodiment.

FIG. 7 is a diagram illustrating a congestion section for calculating a target inter-vehicle distance in the method of controlling of FIG. 6.

FIG. 8 is a diagram illustrating a cut-in situation of a surrounding vehicle while driving in a congestion section according to another exemplary embodiment.

FIG. 9 is a flowchart illustrating a method of controlling a vehicle for calculating by varying a target control speed according to an exemplary embodiment.

FIG. 10 is a diagram illustrating a congestion section for calculating a target control speed in the method of controlling of FIG. 9.

FIGS. 11A and 11B are operational flowcharts illustrating a vehicle control method for calculating by varying a target control speed according to another exemplary embodiment.

FIG. 12 is a diagram illustrating a congestion section for calculating a target control speed in the method of controlling of FIGS. 11A and 11B.

DETAILED DESCRIPTION

Like numerals refer to like factors throughout the specification. Not all factors of embodiments of the present invention will be described, and description of what are commonly known in the art or what overlap each other in the embodiments will be omitted.

The terms as used throughout the specification, such as "~part", "~module", "~member", "~block", etc., may be implemented in software or hardware, and a plurality of "~parts", "~modules", "~members", or "~blocks" may be implemented in a single factor, or a single "~part", "~module", "~member", or "~block" may include a plurality of factors.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, factors, and/or components, but do not preclude the presence or addition of one or more other features, integers, steps, operations, factors, components, and/or groups thereof, unless the context clearly indicates otherwise.

In the specification, it should be understood that, when a member is referred to as being "on/under" another member, it can be directly on/under the other member, or one or more intervening members may also be present.

The terms including ordinal numbers like "first" and "second" may be used to explain various components, but the components are not limited by the terms. The terms are only for distinguishing a component from another.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the operating principles and embodiments of the present invention will be described with reference to the accompanying drawings.

FIG. 1 is a block diagram of a vehicle according to an exemplary embodiment.

In FIG. 1, the vehicle 1 includes an engine 10, a transmission 20, a braking device 30, and a steering device 40.

The engine 10 may include a cylinder and a piston, and may generate power for the vehicle 1 to drive.

The transmission 20 may include a plurality of gears, and transmit power generated by the engine 10 to a wheel.

The braking device 30 may decelerate the vehicle 1 or stop the vehicle 1 through friction with a wheel.

The steering device 40 may vary the driving direction of the vehicle 1.

The vehicle 1 may include a plurality of electric components.

For example, the vehicle 1 further includes an engine management system (EMS) 11, a transmission control unit (TCU) 21, an electronic brake control module 31, an electronic power steering (EPS) 41, a body control module (BCM), and a driver assistance system (DAS).

The engine management system 11 may control the engine 10 in response to a driver's will to accelerate through an accelerator pedal or a request from the driver assistance system 100. For example, the engine management system 11 may control the torque of the engine 10.

The transmission control unit 21 may control the transmission 20 in response to the driver's shift command through the shift lever and/or the driving speed of the vehicle 1. For example, the transmission control unit 21 may adjust a transmission ratio from the engine 10 to a wheel.

The electronic braking control module 31 may control the braking device 30 in response to a braking will of a driver through a braking pedal and/or slip of wheels. For example, the electronic braking control module 31 may temporarily release the braking of a wheel in response to a slip of a wheel detected during braking of the vehicle 1 (Anti-lock Braking Systems, ABS). In addition, the electronic brake control module 31 may temporarily brake a wheel in response to a slip of a wheel detected when the vehicle 1 is driven (Traction Control System, TCS).

The electronic steering device 41 may assist the operation of the steering device 40 so that the driver can easily manipulate the steering wheel in response to the driver's will to steer through the steering wheel. For example, the electronic steering device 41 may assist the operation of the steering device 40 so as to decrease the steering force when driving at a low speed or parking, and increase the steering force when driving at a high speed.

The body control module 51 may control the operation of electronic components that provide convenience to the driver or ensure safety of the driver. For example, the body control module 51 may control a head lamp, a wiper, a cluster, a multi-function switch, and a direction indicator lamp.

The driver assistance system 100 may assist a driver in operating (driving, braking, steering) the vehicle 1. For example, the driver assistance system 100 may sense an environment (for example, other vehicles, pedestrians, cyclists, lanes, road signs, etc.) around the vehicle 1 and control driving and/or braking and/or steering of the vehicle 1 in response to the sensed environment.

The driver assistance system 100 may provide various functions to a driver.

For example, the driver assistance system 100 may provide a lane departure warning (LDW), a lane keeping assist (LKA), a high beam assist (HBA), and an automatic emergency braking (AEB), a traffic sign recognition (TSR), a smart cruise control (SCC), a blind spot detection (BSD), an adaptive cruise control (ACC), etc.

The driver assistance system 100 includes a camera module 101 configured to acquire image data around the vehicle 1 and a radar module 102 configured to acquire object data around the vehicle 1.

The camera module 101 includes a camera 101a and an electronic control unit (ECU) 101b.

The radar module 102 includes a radar 102a and a electronic control unit 102b.

The above electronic components may communicate with each other through a vehicle communication network (NT).

For example, electronic components may transmit and receive data through data through Ethernet, MOST (Media Oriented Systems Transport), Flexray, CAN (Controller Area Network), and LIN (Local Interconnect Network).

For example, the driver assistance system 100 may transmit a driving control signal, a braking signal and a steering signal to the engine management system 11, the electronic braking control module 31, and the electronic steering device 41 through a vehicle communication network NT, respectively.

FIG. 2 is a control block diagram of a vehicle according to an exemplary embodiment.

In FIG. 2, the vehicle 1 according to an exemplary embodiment may further include a sensor 200, an inputter 210, a controller 220, and a driver 230 in addition to the components shown in FIG. 1.

The sensor 200 is mounted on the vehicle 1 to detect driving information of the vehicle 1 and at least one surrounding vehicle 2 (refer to FIGS. 3 and 8) around the vehicle 1, and may include the camera 101a, a radar 102a, a corner radar 201, a steering angle sensor 203, a yaw rate sensor 204, an acceleration sensor 205, a speed sensor 206, and a GPS sensor 207.

The camera 101a may photograph an image around the vehicle 1 and acquire image data around the vehicle 1.

The image data around the vehicle 1 may recognize at least one surrounding vehicle 2 (a preceding vehicle and a following vehicle driving in the same lane, and vehicles driving in the next lane) located around the vehicle 1.

The radar 102a may irradiate a laser beam in the front direction of the vehicle 1, that is, to detect obstacle present on the road, detect the presence of obstacles including the surrounding vehicle (2) by returning reflected from the obstacle, and measure the distance between cars by measuring the time difference reflected and returned.

The radar 102a may include a transmission antenna (or a transmission antenna array) for radiating a transmission wave toward the front of the vehicle 1, and a reception antenna (or a reception antenna array) for receiving a reflected wave reflected from the object.

The radar 102a may acquire radar data from a transmitted transmission wave by a transmitting antenna and a reflected wave received by a receiving antenna.

The radar data may include distance information and a speed level of the surrounding vehicles 2 located around the vehicle 1.

The radar 102a may calculate the state distance to the object based on the phase difference (or time difference) between the transmitted radio wave and the reflected radio wave, and calculate the relative velocity of the object based on the frequency difference between the transmitted radio wave and the reflected radio wave.

The radar 102a may be connected to the controller 220 through, for example, a vehicle communication network NT or a hard wire or a printed circuit board. The radar 102a may transmit radar data to the controller 220.

Here, the camera 101a and the radar 102a are distance measurement sensors for detecting external information (specifically, surrounding vehicles) around the vehicle 1, and may include a lidar or the like as the distance measurement sensor.

The corner radar 201 may include a plurality of corner radars installed on the front right, front left, rear right, and rear left of the vehicle 1.

The plurality of corner radars may have a detection field of the vehicle 1 towards the front right, a detection field of the vehicle 1 towards the front left, a detection field of the vehicle 1 towards the rear right, and a detection field of the vehicle 1 towards the rear left of the vehicle 1.

Each of the plurality of corner radars includes a transmit antenna and a receive antenna, and may acquire corner radar data.

Each of the plurality of corner radars may be connected to the controller 220 through, for example, a vehicle communication network NT or a hard wire or a printed circuit board. Each of the plurality of corner radars may transmit corner radar data to the controller 220.

The steering angle sensor 203 may be installed in a steering column to detect a steering angle adjusted by a steering wheel and transmit it to the controller 220.

The yaw rate sensor 204 may detect a yaw moment generated when the vehicle 1 is turning (for example, when turning to the right or left) and transmit it to the controller 220. The yaw rate sensor 204 has a cesium crystal element inside the sensor, and when the vehicle 1 rotates while moving, the cesium crystal element itself may generate a voltage while rotating. The yaw rate of the vehicle 1 may be measured based on the generated voltage. Thereafter, the measured yaw rate value may be transmitted to the controller 220.

The acceleration sensor 205 measures acceleration of the vehicle 1 and may include a lateral acceleration sensor and a vertical acceleration sensor.

When the moving direction of the vehicle 1 is referred to as the X-axis, the transverse acceleration sensor may measure the acceleration in the transverse direction by referring to the vertical axis (Y-axis) direction of the moving direction as the transverse direction.

Accordingly, the transverse acceleration sensor may detect the transverse acceleration generated when the vehicle 1 is turning (for example, when turning to the right) and transmit it to the controller 220.

The longitudinal acceleration sensor may measure acceleration in the X-axis direction, which is the moving direction of the vehicle 1.

The acceleration sensor 205 is an element that detects a vary in speed per unit time, and detects dynamic forces such as acceleration, vibration, and shock, and measures them using the principle of inertia force, electrical deformation, and gyro. Thereafter, the measured acceleration value may be transmitted to the controller 220.

The speed sensors 206 may be installed on the front and rear wheels of the vehicle 1, respectively, to detect vehicle speeds of each wheel during driving and transmit information on the driving vehicle speed to the controller 220.

The GPS sensor 207 is for identifying the location information (GPS information) of the vehicle 1 and may transmit the identified location information to the controller 220 using telematics communication. The GPS sensor 207 may be configured as a GPS receiver.

In addition, the sensor 200 may further include various sensors mounted on the vehicle 1.

The inputter 210 receives a driver set distance from the driver. The driver set distance is used as data for calculating the target inter-vehicle distance of the vehicle 1.

In addition, the inputter 210 receives a target speed set by the driver (hereinafter, referred to as "driver set speed"). The driver set speed is used as data for calculating the target control speed of the vehicle 1.

The controller 220 is a processor for controlling the overall operation of the vehicle 1 and may be a processor of an electronic control unit (ECU) for controlling the overall operation of the power system.

In addition, the controller 20 may control operations of various modules, devices, etc. equipped with the vehicle 1. According to an embodiment, the controller 220 may control the operation of each component by generating control signals for controlling various modules, devices, etc. equipped with the vehicle 1.

In addition, the controller 220 may include a memory storing programs for performing the operations described above and below and various data related thereto, a processor for executing programs stored in the memory, a hydraulic control unit (HCU), which is a hydraulic control unit, and a micro controller unit (MCU). In addition, the controller 220 may be integrated into a System On Chip (SOC) embedded in the vehicle 1 and may be operated by a processor. However, since there is not only one system-on-chip embedded in the vehicle 1, but may be multiple, it is not limited to being integrated into only one system-on-chip.

The controller 220 may be implemented through at least one type of storage medium among a memory (for example, SD or XD memory, etc.) of a flash memory type, a hard disk type, a multimedia card micro type and a card type memory, and a random access memory (RAM), a static random access memory (SRAM), a read-only memory (ROM), a electrically erasable programmable read-only memory (EEPROM), a programmable read-only memory (PROM), a magnetic memory, a magnetic disk, and an optical disk.

However, it is not limited thereto, and may be implemented in any other form known in the art.

According to an exemplary embodiment, the controller 220 receives a signal transmitted from the sensor 200 and acquire driving information of at least one surrounding vehicle 2 located around the vehicle 1 and information on the own vehicle speed of the vehicle 1.

Through this, the controller 220 may determine whether or not at least one surrounding vehicle 2 exists, and identify the number of surrounding vehicles 2, When it is determined that at least one surrounding vehicle 2 exists, the controller 220 may calculate the target inter-vehicle distance by varying the number of surrounding vehicles 2.

In the case of a plurality of surrounding vehicles 2, since it is not known which of the plurality of surrounding vehicles 2 is cut-in, the controller 220 must identify the number of all surrounding vehicles 2 located around the vehicle 1.

In addition, the controller 220 may vary and calculate the target inter-vehicle distance according to the number of the identified surrounding vehicles 2. This is to vary the distance between target cars for stable autonomous driving in congested sections where cut-in situations often occur.

In addition, the controller 220 may compare the speed of the surrounding vehicle 2 with the own vehicle speed by receiving a signal transmitted from the sensor 200, and determine whether to include the surrounding vehicles 2 in the target for calculating the target inter-vehicle distance according to the comparison result.

That is, the controller 220 compares the speeds of all surrounding vehicles 2 located around the vehicle 1 with the own vehicle speed V, and calculates the speed difference Vd between the vehicle 1 and the surrounding vehicles 2

It is determined whether the calculated speed difference (Vd) is within a predetermined reference range (Vds; for example, ±10 Km).

When the speed difference between the vehicle 1 and the surrounding vehicle 2 is within the reference range, the controller 220 may select the surrounding vehicle 2 as a target vehicle for calculating the target inter-vehicle distance in consideration that the surrounding vehicle 2 corresponding to the speed difference within the reference range may be cut-in.

According to another embodiment, if it is determined that at least one surrounding vehicle 2 exists, the controller 220 may calculate the target control speed by varying the vehicle speed of the surrounding vehicles 2 and the cut-in probability.

Further, the controller 220 may vary and calculate the target control speed according to the identified vehicle speed and cut-in probability for each of the surrounding vehicles 2. This is to vary the target control speed for stable autonomous driving in congested sections where cut-in situations often occur.

In addition, the controller 220 may identify the vehicle speed of the surrounding vehicles 2 by receiving the signal transmitted from the sensor 200, and determine whether to include the surrounding vehicle 2 as a target for calculating the target control speed according to the confirmation result.

That is, the controller 220 calculates the vehicle speed (V1, V2, V3, . . . , Vn) of all the surrounding vehicles 2 located around the vehicle 1 to determine whether the surrounding vehicle 2 is stopping or driving.

When the surrounding vehicle 2 is driving, the controller 220 may select the surrounding vehicle 2 as a target vehicle for calculating the target control speed in consideration of that the surrounding vehicle 2 being driven may be cut-in.

FIG. 3 is a diagram illustrating a cut-in situation of a surrounding vehicle while driving in a congestion section according to an exemplary embodiment.

As shown in FIG. 3, it can be seen that while the vehicle 1 is driving in the lane, a cut-in situation (the p point) occurs in which the surrounding vehicle 2 in the next lane intervenes in front of the vehicle 1, that is, into the driving lane of the vehicle 1.

Therefore, the controller 220 should be able to prevent a collision with the surrounding vehicle 2 in consideration of the driving situation of the surrounding vehicle 2 intervening in the driving lane of the vehicle 1, and to vary the target distance in order to improve the stability of autonomous driving.

To this end, the controller 220 may recognize the position of the vehicle 1 and may recognize the relative position between the vehicle 1 and the surrounding vehicle 2.

That is, the controller 220 may calculate the absolute position (based on a map) of the vehicle 1 using the GPS information received from the GPS sensor 207, and additionally correct the vertical/horizontal position of the vehicle 1 by using a distance measuring sensor such as the camera 101a and the radar 102a.

In addition, the controller 220 may convert the relative position of the surrounding vehicle 2 received from the distance measurement sensor into an absolute position. This means that when the relative position of the vehicle 1 and the surrounding vehicle 2 is known, the absolute position of the surrounding vehicle 2 may be calculated using the absolute position of the vehicle 1.

In addition, the controller 220 may calculate a transverse speed based on a lane in which the surrounding vehicle 2 drives. That is, the location of the surrounding vehicle 2 and the distance based on the lane may be calculated, and the speed may be estimated using the Kalman filter.

The controller 220 may predict the location of the surrounding vehicle 2 and predicts the driving lane based on the predicted location, and determine whether the driving lane of the vehicle 1 and the surrounding vehicle 2 coincide to determine the cut-in situation of the surrounding vehicle 2.

The driver 230 may include all components related to driving and braking of the vehicle 1.

Specifically, the driver 230 may include an engine 10, a motor, a braking device 30 and a steering device 40 of the vehicle 1, and the like, and does not limit the type of a device that is directly or indirectly involved in the driving of the vehicle 1.

Accordingly, the controller 220 may control the driving of the vehicle 1 through the driver 230 based on driving information of at least one surrounding vehicle 2 and the positional relationship between the vehicle 1 and the surrounding vehicles 2.

The controlling the driver 120 by the controller 100 includes controlling the vehicle speed. Specifically, it may include controlling the driving of the motor or engine 10, controlling the braking device 30 to brake the vehicle 1, and controlling the steering device 40 to control steering.

Hereinafter, an operation process and effects of a vehicle and a control method thereof according to an exemplary embodiment will be described.

First, a method of varying the target inter-vehicle distance in consideration of all surrounding vehicles 2 located around the vehicle 1 will be described with reference to FIGS. 4 and 5.

FIG. 4 is an operation flowchart illustrating a vehicle control method for calculating a target inter-vehicle distance by varying the target distance according to an exemplary embodiment, and FIG. 5 is a diagram illustrating a congestion section for calculating a target inter-vehicle distance in the controlling method of FIG. 4.

In FIG. 4, the controller 220 receives a driver set distance set by the driver through the inputter 210 (300).

Subsequently, the controller 220 may acquire the own vehicle speed V of the vehicle 1 using the speed sensor 206 of the sensor 200 while the vehicle 1 is driving (302).

The controller 220 may calculate the target inter-vehicle distance L1 of the vehicle 1 as shown in [Equation 1] below using the driver set distance S input through the inputter 210 and the own vehicle speed V acquired through the speed sensor 206 (304).

Target inter-vehicle distance $L1$=driver set distance $S \times$ own vehicle speed ($V$)     [Equation 1]

In addition, the controller 220 may acquire driving information of at least one surrounding vehicle 2 located around the vehicle 1 by receiving a signal transmitted from the sensor 200 (306).

Through this, the controller 220 may determine whether the surrounding vehicle 2 exists by using the acquired driving information of the at least one surrounding vehicle 2 (308).

As a result of the determination in step 308, if the surrounding vehicle 2 does not exist, the controller 220 feeds back to step 300 to perform subsequent operations.

On the other hand, as a result of the determination in step 308, if the surrounding vehicle 2 exists, the controller 220 may identify the number n of at least one surrounding vehicle 2 located around the vehicle 1 (310).

When the number n of at least one surrounding vehicle 2 is identified, the controller 220 may receive the signal transmitted from the sensor 200 and calculate the inter-vehicle distances (①, ②, ③, ..., ⓝ) of each of the surrounding vehicles 2 located around the vehicle 1 as shown in FIG. 5 (312).

The controller 220 may calculate an average value L1a of the inter-vehicle distances (①, ②, ③, ..., ⓝ) of each of the surrounding vehicles 2 as shown in [Equation 2] below (314).

Average value $L1a$ of the inter-vehicle distances=(①+②+③+ ... +ⓝ)/$n$     [Equation 2]

Accordingly, the controller 220 may be variable and calculated the target inter-vehicle distance L1t of the vehicle 1 to the smallest value min among the target inter-vehicle distance L1 calculated using the driver set distance S and the own vehicle speed V and the average value L1a of the inter-vehicle distances (316).

Accordingly, the controller 220 may implement autonomous driving similar to a driver's driving habits without disturbing the traffic flow in a congested section where a cut-in situation frequently occurs by controlling the vehicle 1 using the calculated target inter-vehicle distance L1t.

a method of varying the target inter-vehicle distance in consideration of the driving situation of the surrounding vehicle 2 whose vehicle speed is similar to the own vehicle speed among the surrounding vehicles 2 located around the vehicle 1 will be described with reference to FIGS. 6 and 7.

FIG. 6 is an operation flowchart illustrating a method of controlling a vehicle for calculating by varying a target inter-vehicle distance according to another exemplary embodiment, and FIG. 7 is a diagram illustrating a congestion section for calculating a target inter-vehicle distance in the method of controlling of FIG. 6.

In FIG. 6, the controller 220 receives a driver set distance set by the driver through the inputter 210 (400).

Subsequently, the controller 220 may acquire the own vehicle speed V of the vehicle 1 using the speed sensor 206 of the sensor 200 while the vehicle 1 is driving (402).

The controller 220 may calculate the target inter-vehicle distance L2 of the vehicle 1 as shown in [Equation 3] below using the driver set distance S input through the inputter 210 and the own vehicle speed V acquired through the speed sensor 206 (404).

Target inter-vehicle distance $L2$=driver set distance $S \times$ own vehicle speed $V$     [Equation 3]

In addition, the controller 220 the controller 220 may acquire driving information of at least one surrounding vehicle 2 located around the vehicle 1 by receiving a signal transmitted from the sensor 200 (406).

Through this, the controller 220 may determine whether the surrounding vehicle 2 exists using the acquired driving information of the surrounding vehicle 2 (408).

As a result of the determination in step 408, if the surrounding vehicle 2 does not exist, the controller 220 feeds back to step 400 to perform subsequent operations.

On the other hand, as a result of the determination in step 408, if the surrounding vehicles 2 exist, the controller 220 may identify the number n of the surrounding vehicles 2 located around the vehicle 1 (410).

When the number n of the surrounding vehicles 2 is identified, the controller 220 receives the signal transmitted from the sensor 200 and calculates the vehicle speed V1, V2, V3, ..., Vn of each of the surrounding vehicles 2 located around the vehicle 1 (412).

Subsequently, The controller 220 calculates the speed difference Vd1, Vd2, Vd3, ..., Vdn of each of the vehicle 1 and the surrounding vehicle 2 by comparing the calculated vehicle speed V1, V2, V3, ..., Vn and the own vehicle speed V, respectively (414).

The controller 220 may determine whether to include the surrounding vehicle 2 as a target for calculating the target inter-vehicle distance using the calculated speed differences Vd1, Vd2, Vd3, ..., Vdn.

That is, the controller 220 determines whether the calculated speed difference Vd1, Vd2, Vd3, ..., Vdn is within a predetermined reference range (Vds; for example, ±10 Km).

When the speed difference Vd1, Vd2, Vd3, ..., Vdn between the vehicle 1 and the surrounding vehicle 2 is within the reference range Vds, the controller 220 may select the surrounding vehicle 2 as a target vehicle for calculating the target inter-vehicle distance in consideration of the ability to cut-in the surrounding vehicles 2 whose speed differences Vd1, Vd2, Vd3, ..., Vdn are within the reference range Vds (416).

Subsequently, the controller 220 may calculate the inter-vehicle distances (e.g., ②, ③, ⑥, ⑦, ⑧ of each of the surrounding vehicles 2 selected as targets for calculating the target inter-vehicle distance, as shown in FIG. 7 (418).

The controller 220 may calculate the average value L2a of the calculated inter-vehicle distances ②, ③, ⑥, ⑦, ⑧) of each of the surrounding vehicles 2 as shown in [Equation 4] below (420).

Average value $L2a$ of the inter-vehicle distances=(②+③+⑥+⑦+⑧)/5     [Equation 4]

Accordingly, the controller 220 may be variable and calculated the target inter-vehicle distance L2t of the vehicle 1 to the smallest value min among the target inter-vehicle distance L2 calculated using the driver set distance S and the own vehicle speed V and the average value L2a of the inter-vehicle distances (422).

Accordingly, the controller 220 may implement autonomous driving similar to a driver's driving habits without disturbing the traffic flow in a congested section where a cut-in situation frequently occurs by controlling the vehicle 1 using the calculated target inter-vehicle distance L2t.

FIG. 8 is a diagram illustrating a cut-in situation of a surrounding vehicle while driving in a congestion section according to another exemplary embodiment.

As shown in FIG. 8, it can be seen that while the vehicle 1 is driving in the lane, a cut-in situation (the p point) occurs in which the surrounding vehicle 2 in the next lane intervenes in front of the vehicle 1, that is, into the driving lane of the vehicle 1.

Therefore, the controller 220 should be able to prevent a collision with the surrounding vehicle 2 in consideration of the driving situation of the surrounding vehicle 2 intervening in the driving lane of the vehicle 1, and to vary the target control speed in order to improve the stability of autonomous driving.

In order to determine the cut-in situation, the controller 220 may acquire vehicle speeds V1, V2, V3, . . . , Vn of the surrounding vehicles 2 and a cut-in probability using the camera 101a, radar 102a, and a plurality of corner radars 201 of the sensor 200

In more detail, when the moving direction of the surrounding vehicle 2 is the X-axis, the transverse acceleration of the surrounding vehicle 2 can be measured as the vertical axis (Y-axis) direction of the moving direction referred to as the lateral direction.

The controller 220 may acquire a cut-in probability by detecting a lateral acceleration generated when the surrounding vehicle 2 is cut-in (for example, when turning in the Y-axis direction), by receiving signals transmitted from the camera 101a, radar 102a and a plurality of corner radars 201 of the sensor 200.

Based on the vehicle (1), when the surrounding vehicle 2 is driving in the X-axis direction, the cut-in probability of the surrounding vehicle 2 is 0% (=0), and when the surrounding vehicle 2 drives in the Y-axis direction, the cut-in probability of the surrounding vehicle 2 is 100% (=1).

Accordingly, the controller 220 may acquire a cut-in probability from 0 to 100% from the X-axis direction to the Y-axis direction according to the moving direction of the surrounding vehicle 2, and convert the cut-in constant value to 0 to 1 according to the cut-in probability.

Accordingly, the controller 220 may calculate the cut-in speed of each of the surrounding vehicles 2 by using the vehicle speed V1, V2, V3, . . . , Vn of each of the surrounding vehicles 2 and the cut-in constant value.

In addition, the controller 220 identifies the vehicle speeds V, V2, V3, . . . , Vn of all surrounding vehicles 2 located around the vehicle 1 and determines whether the surrounding vehicles 2 are stopping or driving.

When the surrounding vehicle 2 is driving, the controller 220 may select the surrounding vehicle 2 as a target vehicle for calculating the target control speed in consideration of the ability to cut-in the surrounding vehicle 2 while driving.

In addition, the controller 220 may identify whether the vehicle 1 is driving in a congested section by using the camera 101a, the radar 102a, and a plurality of corner radars 201 of the sensor 200.

Hereinafter, an operation process and effects of a vehicle and a method of controlling thereof according to another embodiment will be described.

First, a method of varying the target control speed in consideration of all surrounding vehicles 2 located around the vehicle 1 will be described with reference to FIGS. 9 and 10.

FIG. 9 is a flowchart illustrating a method of controlling a vehicle for calculating by varying a target control speed according to an exemplary embodiment, and FIG. 10 is a diagram illustrating a congestion section for calculating a target control speed in the method of controlling of FIG. 9.

In FIG. 9, the controller 220 receives a driver set speed $V1s$ set by the driver through the inputter 210 (500).

Subsequently, the controller 220 may acquire the own vehicle speed V of the vehicle 1 by using the speed sensor 206 of the sensor 200 while the vehicle 1 is driving (502).

In addition, the controller 220 may receive driving information of at least one surrounding vehicle 2 located around the vehicle 1 by receiving a signal transmitted from the sensor 200 (504).

Through this, the controller 220 may determine whether the surrounding vehicle 2 exists using the acquired driving information of the at least one surrounding vehicle 2 (506).

As a result of the determination in step 506, if the surrounding vehicle 2 does not exist, the controller 220 feeds back to step 500 to perform subsequent operations.

On the other hand, as a result of the determination in step 506, when the surrounding vehicle 2 exists, the controller 220 may identify the number n of at least one surrounding vehicle 2 located around the vehicle 1 (508).

When the number (n) of the at least one surrounding vehicle 2 is identified, the controller 220 may receive a signal transmitted from the sensor 200 and acquire vehicle speeds V1, V2, V3, . . . , Vn and a cut-in probability of each of the surrounding vehicles 2 located around the vehicle 1 as shown in FIG. 10 (510).

Specifically, the controller 220 may receive signals transmitted from the camera 101a, radar 102a, and a plurality of corner radars 201 of the sensor 200, and acquire a cut-in probability by detecting a lateral acceleration generated when the surrounding vehicle 2 is cut-in.

As shown in FIG. 8, when the surrounding vehicle 2 drives in the X-axis direction, the cut-in probability of the surrounding vehicle 2 is 0% (=0) when viewed from the vehicle 1, and when the surrounding vehicle 2 drives in the Y-axis direction, the cut-in probability of the surrounding vehicle 2 is 100% (=1).

Accordingly, the controller 220 may acquire a cut-in probability from 0 to 100% from the X-axis direction to the Y-axis direction according to the moving direction of the surrounding vehicle 2, and convert the cut-in constant values m1, m2, m3, . . . , mn into 0 to 1 according to the acquired cut-in probability (0 to 100%).

Accordingly, the controller 220 may calculate the cut-in speeds V1cut, V2cut, V3cut, . . . , Vncut of each of the surrounding vehicles 2 (512) using the vehicle speed V1, V2, V3, . . . , Vn and cut-in constant values m1, m2, m3, . . . , mn of each of the surrounding vehicles (2) as shown in [Equation 5] below.

$$\text{Cut-in speed } V1cut = \text{vehicle speed } V1/\text{cut-in constant value } m1,$$

$$\text{Cut-in speed } V2cut = \text{vehicle speed } V2/\text{cut-in constant value } m2, \ldots$$

$$\text{Cut-in speed } Vncut = \text{vehicle speed } Vn/\text{Cut-in constant value } mn \quad \text{[Equation 5]}$$

Subsequently, the controller 220 may calculate the smallest minimum value min among the calculated cut-in speeds V1cut, V2cut, V3cut, . . . , Vncut as the target cut-in speed $V1t$ of the surrounding vehicle 2 (514) as shown in [Equation 6] below.

$$\text{Target cut-in speed}(V1t) = \min\ V1cut, V2cut, V3cut, \ldots, Vncut \quad \text{[Equation 6]}$$

Accordingly, the controller 220 may vary and calculate the target control speed V1target of the vehicle 1 as the smallest minimum value min of the driver set speed $V1s$ and the target cut-in speed $V1t$ (516).

Accordingly, the controller 220 may prevent a collision with the surrounding vehicle 2 intervening in a congestion section where a cut-in situation frequently occurs by controlling the vehicle 1 using the calculated target control speed V1target.

Next, a method of varying the target control speed in consideration of the driving condition of the surrounding vehicle 2 being stopped among the surrounding vehicles 2 located around the vehicle 1 will be described with reference to FIGS. 11A, 11B and 12.

FIGS. 11A and 11B are operational flowcharts illustrating a vehicle control method for calculating by varying a target control speed according to another exemplary embodiment, and FIG. 12 is a diagram illustrating a congestion section for calculating a target control speed in the method of controlling of FIGS. 11A and 11B.

In FIGS. 11A and 11B, the controller 220 receives the driver set speed V2s set by the driver through the inputter 210 (600).

In addition, the controller 220 may receive the signal transmitted from the sensor 200 and acquire driving information of at least one surrounding vehicle 2 located around the vehicle 1 (604).

Through this, the controller 220 may determine whether the surrounding vehicle 2 exists by using the acquired driving information of the at least one surrounding vehicle 2 (606).

When the number n of the at least one surrounding vehicle 2 is confirmed, the controller 220 sets a constant value k of the surrounding vehicle 2 to 0 in order to identify the surrounding vehicle 2 being stopped (610).

The controller 220 determines whether the number n of the surrounding vehicles 2 is greater than the constant value k of the surrounding vehicles 2 by comparing the number n of the surrounding vehicles 2 and the constant value k of the surrounding vehicles 2 (612).

As a result of the determination in step 612, when the number n of the surrounding vehicles 2 is not greater than the constant value k of the surrounding vehicles 2, the controller 220 feeds back to step 600 to continuously identify the surrounding vehicles 2 around the vehicle 1 to perform a subsequent operation.

As a result of the determination in step 612, when the number n of the surrounding vehicles 2 is greater than the constant value k of the surrounding vehicles 2, the controller 220 increases the constant value k of the surrounding vehicles 2 by +1 (614).

Accordingly, the controller 220 receives the signal transmitted from the sensor 200 and determines whether the k-th (specifically, the first) surrounding vehicle 2 is stopped (616).

As a result of the determination in step 616, if the k-th (specifically, the first) surrounding vehicle 2 is stopped, The controller 220 feeds back to step 614 to increase the constant value k of the surrounding vehicle 2 by +1. This is to identify driving information of the second surrounding vehicle 2 among surrounding vehicles 2 located around the vehicle 1.

Through this method, the controller 220 may identify the surrounding vehicle 2 being stopped from among the surrounding vehicles 2 located around the vehicle 1.

On the other hand, as a result of the determination in step 616, if the k-th (specifically, the first) neighboring vehicle 2 is not stopped, the controller 220 may select the k-th (specifically, the first) surrounding vehicle 2 as a target vehicle for calculating the target control speed (618).

Subsequently, the controller 220 determines whether the constant value k of the surrounding vehicles 2 is equal to the number n of the surrounding vehicles 2 (620).

As a result of the determination in step 620, when the constant value k of the surrounding vehicles 2 is not equal to the number n of the surrounding vehicles 2, the controller 220 feeds back to step 614 to increase the constant value k of the surrounding vehicle 2 by +1. This is to determine whether all surrounding vehicles 2 located around the vehicle 1 are stopped.

On the other hand, as a result of the determination in step 620, when the constant value k of the surrounding vehicles 2 is equal to the number n of the surrounding vehicles 2, since the stopping state of all the surrounding vehicles 2 located around the vehicle 1 is determined, the controller 220 may acquire the vehicle speed (for example, V2, V3, V4, V6) and the cut-in probability of each of the selected surrounding vehicles 2 as shown in FIG. 12 (622).

Accordingly, the controller 220 may calculate the cut-in speeds (V2cut, V3cut, V4cut, V6cut) of each of the surrounding vehicles 2 as shown in [Equation 7] below using the vehicle speed (for example, V2, V3, V4, V6) and the cut-in constant value (for example, m2, m3, m4, m6) of each of the surrounding vehicles 2 (624).

$$Cut\text{-in speed } V2cut = \text{Vehicle speed } V2/Cut\text{-in constant value } m2$$

$$Cut\text{-in speed } V3cut = \text{Vehicle speed } V3/Cut\text{-in constant value } m3$$

$$Cut\text{-in speed } V4cut = \text{Vehicle speed } V4/Cut\text{-in constant value } m4$$

$$Cut\text{-in speed } V6cut = \text{Vehicle speed } V6/Cut\text{-in constant value } m6 \quad \text{[Equation 7]}$$

Subsequently, the controller 220 may calculate the smallest minimum value min among the calculated cut-in speeds V2cut, V3cut, V4cut, and V6cut as the target cut-in speed V2t of the surrounding vehicle 2 as shown in [Equation 8] below (626).

$$\text{Target } cut\text{-in speed } V2t = \min\, V2cut, V3cut, V4cut, V6cut \quad \text{[Equation 8]}$$

Accordingly, the controller 220 may vary and calculate the target control speed V2target of the vehicle 1 with the smallest minimum value min of the driver set speed V2s and the target cut-in speed V2t (628).

Accordingly, the controller 220 may prevent a collision with the surrounding vehicle 2 intervening in a congestion section in which a cut-in situation occurs frequently by controlling the vehicle 1 using the calculated target control speed V2target.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An apparatus for assisting driving of a host vehicle, the apparatus comprising:
   at least one sensor of an image sensor or a radar sensor mounted to the host vehicle and having a field of view outside of the host vehicle; and
   a controller communicatively connected to the at least one sensor,
   wherein the controller is configured to:
      identify a plurality of surrounding vehicles around the host vehicle based on processing an output of the at least one sensor,
      calculate a target inter-vehicle distance based on an own vehicle speed of the host vehicle and a driver set distance received from a driver, and
      vary the calculated target inter-vehicle distance based on driving information of the plurality of surrounding vehicles, and
   wherein the controller is further configured to:
      calculate a vehicle speed of each of the plurality of surrounding vehicles,
      calculate a speed difference between the host vehicle and the each of the plurality of surrounding vehicles based on comparing the calculated vehicle speed with the own vehicle speed,
      select at least one first surrounding vehicle among the plurality of surrounding vehicles as at least one target for calculating the target inter-vehicle distance based on the calculated speed difference and a reference speed range, wherein the at least one first surrounding vehicle runs on a different lane from the lane of the host vehicle and has the calculated speed difference within the reference speed range so that the at least one first surrounding vehicle can be considered a potential cut-in vehicle,
      calculate an average inter-vehicle distance based on a number of the at least one first surrounding vehicle selected as the at least one target for calculating the target inter-vehicle distance and an inter-vehicle distance of each of the at least one first surrounding vehicle, and
      vary the target inter-vehicle distance to a minimum value among the calculated target inter-vehicle distance and the calculated average inter-vehicle distance.

2. A method for assisting driving of a host vehicle, the method comprising:
   processing an output of at least one sensor of an image sensor or a radar sensor mounted to the host vehicle and having a field of view outside of the host vehicle;
   identify a plurality of surrounding vehicles around the host vehicle based on the processing of the output of the at least one sensor;
   calculating a target inter-vehicle distance based on an own vehicle speed of the host vehicle and a driver set distance received from a driver;
   determining whether the plurality of surrounding vehicles exist based on driving information of the plurality of surrounding vehicles;
   confirming a number of the at least one surrounding vehicle based on the determining of whether the plurality of surrounding vehicles exist;
   calculating an average inter-vehicle distance based on the number of the plurality of surrounding vehicles and an inter-vehicle distance of each of the plurality of surrounding vehicles; and
   varying the target inter-vehicle distance based on the driving information of the plurality of surrounding vehicles,
   wherein the calculating a target inter-vehicle distance includes:
      calculating a vehicle speed of each of the plurality of surrounding vehicles;
      calculating a speed difference between the host vehicle and each of the plurality of surrounding vehicles by comparing the calculated vehicle speed with the own vehicle speed; and
      selecting at least one first surrounding vehicle among the plurality of surrounding vehicles as at least one target for calculating the target inter-vehicle distance based on the calculated speed difference and a reference speed range, wherein the at least one first surrounding vehicle runs on a different lane from the lane of the host vehicle and has the calculated speed difference within the reference speed range so that the at least one first surrounding vehicle can be considered a potential cut-in vehicle,
   wherein the calculating an average inter-vehicle distance includes:
      calculating an average inter-vehicle distance based on a number of the at least one first surrounding vehicle selected as the at least one target for calculating the target inter-vehicle distance and an inter-vehicle distance of each of the at least one first surrounding vehicle, and
   wherein the varying the target inter-vehicle distance includes:
      varying the target inter-vehicle distance to a smaller value between the calculated target inter-vehicle distance and the calculated average inter-vehicle distance.

3. An apparatus for assisting driving of a host vehicle, the apparatus comprising:
   at least one sensor of an image sensor or a radar sensor mounted to the host vehicle and having a field of view outside of the host vehicle; and
   a controller communicatively connected to the at least one sensor,
   wherein the controller is configured to:
      identify at least one surrounding vehicle around the host vehicle based on processing an output of the at least one sensor,
      calculate a target cut-in speed of the at least one surrounding vehicle based on driving information of the at least one surrounding vehicle, and
      vary a target control speed based on the calculated target cut-in speed and a driver set speed, and
   wherein the controller is further configured to:
      acquire a vehicle speed and a cut-in probability of each of the at least one surrounding vehicle,
      calculate a cut-in speed of each of the at least one surrounding vehicle based on the acquired vehicle speed and cut-in probability of each of the at least one surrounding vehicle, and
      calculate the target cut-in speed based on the calculated cut-in speed of each of the at least one surrounding vehicle.

4. The apparatus of claim 3, wherein the controller is configured to:
  determine whether the at least one surrounding vehicle exists based on the driving information of the at least one surrounding vehicle, and
  identify a number of the at least one surrounding vehicle.

5. The apparatus of claim 4, wherein the controller is configured to receive a signal transmitted from the sensor and detect a lateral acceleration generated based on the at least one surrounding vehicle being cut in to acquire the cut-in probability.

6. The apparatus of claim 4, wherein the controller is configured to calculate the target cut-in speed as a minimum value among the calculated cut-in speed of each of the at least one surrounding vehicle.

7. The apparatus of claim 6, wherein the controller is configured to vary the target control speed to a minimum value among the calculated target cut-in speed and the driver set speed.

8. The apparatus of claim 4, wherein the controller is configured to: identify a surrounding vehicle being stopped according to the acquired vehicle speed of each of the at least one surrounding vehicle, and
  select surrounding vehicles driving excluding the surrounding vehicle being stopped as targets for calculating a target control speed.

9. The apparatus of claim 8, wherein the controller is configured to:
  acquire a vehicle speed and a cut-in probability of each of the at least one surrounding vehicle selected as the target vehicle for calculating the target control speed,
  calculate a cut-in speed of each of the at least one surrounding vehicle based on the acquired vehicle speed and cut-in probability of each of the at least one surrounding vehicle, and
  calculate the target cut-in speed as a minimum value among the calculated cut-in speed of each of the at least one surrounding vehicle.

10. The apparatus of claim 9, wherein the controller is configured to vary the target control speed to a minimum value among the calculated target cut-in speed and the driver set speed.

* * * * *